United States Patent [19]

Goto et al.

[11] Patent Number: 4,686,588
[45] Date of Patent: Aug. 11, 1987

[54] AZIMUTH ADJUSTMENT APPARATUS FOR A MAGNETIC HEAD

[75] Inventors: Hideo Goto, Tachikawa; Akira Imamura, Tokyo, both of Japan

[73] Assignee: Nakamichi Corporation, Tokyo, Japan

[21] Appl. No.: 665,441

[22] Filed: Oct. 26, 1984

[30] Foreign Application Priority Data

Nov. 1, 1983 [JP] Japan .................................. 58-169764
Nov. 9, 1983 [JP] Japan .................................. 58-173485

[51] Int. Cl.⁴ .............................................. G11B 5/56
[52] U.S. Cl. ...................................... 360/76; 360/109
[58] Field of Search .................... 360/75, 76, 109, 107

[56] References Cited

U.S. PATENT DOCUMENTS

| | | | |
|---|---|---|---|
| 3,029,318 | 4/1962 | Fay et al. ............................ | 360/109 |
| 3,900,888 | 8/1975 | Uchikoshi et al. .................... | 360/76 |
| 4,101,937 | 7/1978 | Jenkins ................................ | 360/76 |
| 4,317,144 | 2/1982 | DeNiet et al. ........................ | 360/76 |
| 4,433,351 | 2/1984 | Vogelgesang ........................ | 360/76 |
| 4,460,934 | 7/1984 | Yamada ............................ | 360/76 X |
| 4,519,006 | 5/1985 | Nakamichi ............................ | 360/76 |

FOREIGN PATENT DOCUMENTS

| | | | |
|---|---|---|---|
| 57-69544 | 4/1982 | Japan ..................................... | 360/76 |
| 58-102325 | 6/1983 | Japan .................................... | 360/109 |
| 58-164016 | 9/1983 | Japan .................................... | 360/109 |
| 58-175127 | 10/1983 | Japan .................................. | 360/109 |
| 58-175128 | 10/1983 | Japan .................................. | 360/109 |
| 59-84331 | 5/1984 | Japan .................................. | 360/109 |

OTHER PUBLICATIONS

Funkschau, No. 25, "Automatic Sound Head Positioning", 12/80, Dolberg, pp. 91-92.

Primary Examiner—Raymond F. Cardillo
Assistant Examiner—Steven R. Garland
Attorney, Agent, or Firm—Pearne, Gordon, McCoy & Granger

[57] ABSTRACT

This invention relates to azimuth adjustment apparatus for a magnetic head and, more particularly, to azimuth adjustment apparatus for a reproducing head. The azimuth adjustment apparatus for a magnetic head comprises an azimuth adjuster including a control motor to adjust an azimuth of a magnetic head and manual azimuth instruction apparatus including at least one manually variable resistor for generating an azimuth control signal connected to control the motor to vary the azimuth position of the magnetic head in accordance with the resistance value of the manually variable resistor. In case the azimuth adjustment apparatus for the magnetic head is applied to an automatically reversible tape recorder, the manual azimuth instruction apparatus includes forward and reverse variable resistors to be selected in accordance with the direction in which a magnetic tape runs.

5 Claims, 3 Drawing Figures

AZIMUTH ADJUSTMENT APPARATUS FOR A MAGNETIC HEAD

BACKGROUND OF THE INVENTION

In one of the prior art references, azimuth adjustment means for a magnetic head is adapted to automatically adjust the azimuth of the magnetic head by detecting the phase difference between divided reproduced signals which are obtained by reproducing in a divided manner a recorded signal on a magnetic tape on one track thereof as disclosed by U.S. Pat. No. 4,317,444. However, such azimuth adjustment means is required to have the magnetic head specially constructed, which causes the azimuth adjustment means to have a complicated and expensive construction. In another prior art reference, an azimuth adjustment device for a magnetic head comprises a manually operated adjustment screw. However, this device requires means, such as a screwdriver, to operate the adjustment screw. In addition thereto, it is not easy to operate the manually operated screw because it is disposed within a case of the tape recorder. Furthermore, in this azimuth adjustment device, the reference azimuth position of the magnetic head cannot be determined, which causes the adjustment to be troublesome because the azimuth should be adjusted every time the magnetic tape runs or a different magnetic tape is used.

In an automatically reversible tape recorder, it is known that passage of a magnetic tape in a forward direction is not identical to that in a reverse direction. Thus, the azimuth position of a reproducing magnetic head, for example, which is precisely adjusted when a magnetic tape runs in one direction, will be out of order when it runs in another direction.

SUMMARY OF THE INVENTION

Accordingly, it is a principal object of the invention to provide a manual azimuth adjustment device adapted to easily adjust the azimuth of a magnetic head without any complicated construction.

It is another object of the invention to provide a manual azimuth adjustment device adapted to easily adjust the azimuth of the magnetic head while a reference azimuth position can be determined.

It is another object of the invention to provide a manual azimuth adjustment device adapted to be inexpensively constructed.

It is a further object of the invention to provide a manual azimuth adjustment device for a magnetic head of an automatically reversible tape recorder adapted to precisely adjust the azimuth position of the magnetic head in both directions in which the magnetic tape runs.

In accordance with the invention, there is provided manual azimuth adjustment means for a magnetic head comprising azimuth instruction means including variable resistor means at least partially manually operable and generating an azimuth control signal responsive to a manual change of resistance value of said variable resistor means, and means including a control motor connected to be responsive to said azimuth control signal and connected to vary the azimuth position of said magnetic head, so that said azimuth position of said magnetic head can be manually adjusted to an appropriate azimuth position while an operator listens to a reproduced signal.

BRIEF DESCRIPTION OF THE DRAWINGS

The above and other objects and features of the invention will be apparent from the description of the embodiments taken with reference to the accompanying drawings, in which.

DETAILED DESCRIPTION OF THE EMBODIMENTS

Figure 1:
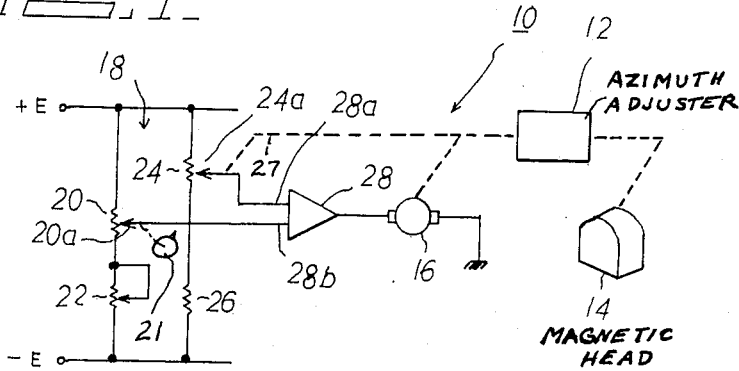
FIG. 1 is a schematic diagram of a manual azimuth adjustment device for a magnetic head constructed in accordance with one embodiment of the invention.

Referring now to FIG. 1, there is shown a manual azimuth adjustment means 10 for a magnetic head constructed in accordance with one embodiment of the invention. The azimuth adjustment means 10 comprises a conventionally constructed azimuth adjuster 12 to physically adjust a reproducing magnetic head 14, for example. The azimuth adjuster 12 includes a reversible control motor 16 which drives the azimuth adjuster 12 in a forward or reverse direction to adjust the magnetic head 14 in a clockwise or counterclockwise direction. It should be noted that the azimuth adjuster 12 may be constructed as disclosed in U.S. Pat. No. 4,344,099 assigned to Nakamichi Corporation.

The azimuth adjustment means 10 further comprises a manual azimuth instruction means 18 which includes first and third variable resistors 20 and 22 connected in series with each other across power sources +E and −E and a second variable resistor 24 and a fixed resistor 26 connected in series with each other across the power sources +E and −E. Variable terminals 20a and 24a of the first and second variable resistors 20 and 24 are connected to input terminals 28a and 28b of a voltage comparator 28, respectively, which is in turn connected to an input terminal of the reversible control motor 16.

A manually operated portion of the first variable resistor 20 may comprise an operation knob 21 so exposd on an operation panel of a tape recorder that it can be manually operated. The first variable resistor 20 further includes a neutral point clicking or detent mechanism (not shown). The second variable resistor 24 has a variable contact so physically connected by linkage 27 to the control motor 16 that it is moved in accordance with rotation of the control motor 16.

The voltage comparator 28 compares the voltages applied to the input terminals 28a and 28b thereof to control the rotation of the control motor 16. If the value of the voltage from the variable terminal 20a is higher than that from the variable terminal 24a, then the control motor 16 is forwardly rotated. If the former is lower than the latter, then the control motor 16 is reversely rotated. If the former is equal to the latter, then the control motor 16 is stopped.

If the manually operated portion 20a of the first variable resistor 20 is positioned at the detent neutral point, then the reproducing magnetic head 14 is set at a reference azimuth position which corresponds to a proper azimuth position relative to a reference magnetic tape (not shown) for adjusting the azimuth, for example. The third variable resistor 22 serves to adjust the reference azimuth position.

In operation, when a recorded sound signal is reproduced from the magnetic tape by the tape recorder to which the manual azimuth adjustment means of the invention is applied, the operator moves the operation knob 21 on the operation panel while he is listening to the reproduced sound signal to adjust the azimuth position of the reproducing magnetic head 4. In this manner, when the operation knob is set at the position where the reproducing characteristic is best in view of audition, the reproducing magnetic head 14 is positioned at a proper azimuth position relative to the magnetic tape during reproducing thereof.

After the magnetic tape reproduction is finished, the operation knob 21 is returned to the detent neutral point to return the reproducing magnetic head 14 to the reference azimuth position.

Figure 2:
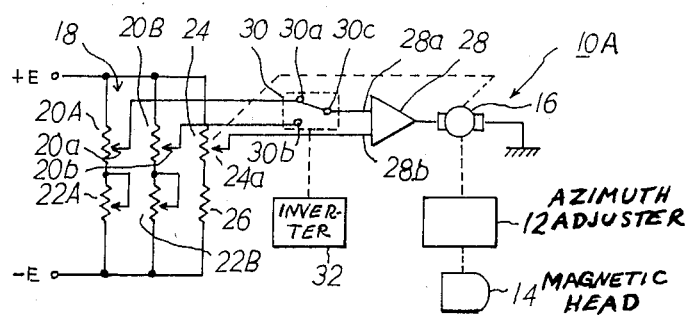
FIG. 2 is a schematic diagram of a manual azimuth adjustment device for a magnetic head constructed in accordance with another embodiment of the invention.

FIG. 2 shows another embodiment of the invention 10A, which may be applied to an automatically reversible tape recorder. In this embodiment, the manual azimuth instruction means 18 includes forwarding and reversing first variable resistors 20A and 20B and forwarding and reversing third variable resistors 22A and 22B connected in series to the variable resistors 20A and 20B, respectively. Variable terminals 20a and 20b of the first variable resistors 20A and 20B are connected to stationary contacts 30a and 30b of a changeover switch 30 while a movable contact 30c of the changeover switch 30 is connected to the input terminal 28a of the voltage comparator 28. The variable terminal 24a of the second variable resistor 24 is connected to the input terminal 28b of the voltage comparator 28 or difference amplifier. The movable contact 30c of the switch 30 is controlled in accordance with inverter means 32, which in turn switches the direction of tape running. In FIG. 2, the same numerals designate the same components. As mentioned in the embodiment of FIG. 1, the third variable resistors 22A and 22B serve to set the reference azimuth position relative to the forward and reverse directions of the magnetic tape running.

The resistance values of these variable resistors 22A and 22B are so set that the reproducing magnetic head 14 is positioned at the reference azimuth position which corresponds to the proper azimuth relative to the reference tape (not shown) for adjusting the azimuth, for example. Thus, it will be noted that when the first variable resistors 20A and 20B are manually set at the detent neutral points, respectively, the reproducing magnetic head 14 is at the reference azimuth position in the forward direction of the tape running in which the movable contact 30c of the changeover switch 30 is engaged with the stationary contact 30a while the reproducing magnetic head 14 is at the reference azimuth position in the reverse direction of the tape running in which the movable contact 30c of the changeover switch 30 is engaged with the stationary contact 30b. When the first variable resistor 20A or 20B is manually operated out of the neutral points during the tape running in the forward or reverse direction, the azimuth of the reproducing magnetic head may vary in accordance with the variation in each resistance value.

Figure 3:
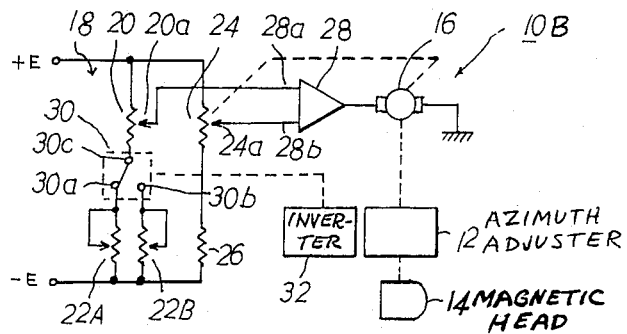
FIG. 3 is a schematic diagram of a manual azimuth adjustment device for a magnetic head constructed in further embodiment of the invention.

FIG. 3 shows a modification 10B of the manual azimuth adjustment means of FIG. 2. In this modification, only one first variable resistor 20 is used and the changeover switch 30 is disposed between the first variable resistor 20 and the two third variable resistors 22A and 22B. The same numerals designate the same components as in the embodiments of FIGS. 1 and 2. It will be understood that the operation of the modification is identical to that of the embodiment of FIG. 2.

Although some preferred embodiments of the invention have been described and illustrated with reference to the accompanying drawings, it will be understood by those skilled in the art that they are by way of example, and that various changes and modifications may be made without departing from the spirit and scope of the invention. For example, although the invention is applied to a reproducing magnetic head, it may be applied to a recording magnetic head and/or a recording and reproducing magnetic head. Furthermore, the first variable resistor may be remotely controlled by a remote controller. It should be noted that the invention is intended to be defined only by the appended claims.

What is claimed is:

1. Manual azimuth adjustment means for a magnetic head comprising:

azimuth instruction means including variable resistor means having a first manually variable resistor, a second variable resistor having a variable terminal moved in accordance with rotation of a control motor and a third variable resistor connected to said first manually variable resistor to determine a reference azimuth position of said magnetic head when said first manually variable resistor is positioned at a detent neutral point, and circuit means to generate a variable amplitude azimuth control signal based on the value of said second variable resistor compared with a combination of said first and third variable resistors;

and means including said control motor electrically connected to said azimuth instruction means to be responsive to said azimuth control signal and physically connected to said magnetic head to vary the azimuth position of said magnetic head, so that said azimuth position of said magnetic head can be manually adjusted to an appropriate azimuth position by said first variable resistor while in a playback operation.

2. Manual azimuth adjustment means for a magnetic head as set forth in claim 1, wherein said third variable resistor is connected in series with said first variable resistor.

3. Manual azimuth adjustment means for a magnetic head as set forth in claim 1, wherein said circuit means includes a difference amplifier to form said azimuth control signal.

4. Manual azimuth adjustment means for a magnetic head as set forth in claim 1, wherein said azimuth instruction means further comprises another first manually variable resistor for reverse direction of tape running, and means for selecting one of said first manually variable resistors in accordance with selection of one of a forward or reverse directions of said tape running.

5. Manual azimuth adjustment means for a magnetic head as set forth in claim 1, wherein said azimuth instruction means further comprises another third variable resistor connectable in series with said first variable resistor for determining a reference azimuth position of said magnetic head during tape running in a reverse direction, and means for selecting one of said third variable resistors in accordance with one of the forward and reverse directions of tape running.

* * * * *